March 4, 1924.

E. E. CHAPMAN 1,485,595

SHACKLE FOR AUTOMOBILE WHEELS AND SPOKES

Original Filed March 2, 1920

Inventor
Earle E. Chapman
by Graham & Hurir
—Attorneys

Patented Mar. 4, 1924.

1,485,595

UNITED STATES PATENT OFFICE.

EARLE E. CHAPMAN, OF LOS ANGELES, CALIFORNIA, ASSIGNOR TO MILLER-CHAPMAN COMPANY, A CORPORATION OF CALIFORNIA.

SHACKLE FOR AUTOMOBILE WHEELS AND SPOKES.

Original application filed March 2, 1920, Serial No. 363,087. Divided and this application filed February 21, 1921. Serial No. 446,898.

*To all whom it may concern:*

Be it known that I, EARLE E. CHAPMAN, a citizen of the United States, residing at Los Angeles, Los Angeles County, California, have invented a new and useful Improvement Comprising the Shackle for Automobile Wheels and Spokes, of which the following is a specification.

My invention relates to shackles which are adapted to be secured about the wheel of an automobile for the purpose of preventing theft or unauthorized use thereof. Such shackles are ordinarily secured about one of the front wheels, being locked therearound so that the shackle is difficult to remove and so that they will produce an unmistakable sound and make a plain trail in case the automobile is operated with the shackle in place thereon.

An object of the invention is to provide a shackle for this purpose which will make an unmistakable sound, preventing the automobile from running at a high speed, and which will also leave a distinctive mark on the surface of the street in case the automobile is driven with the shackle in the place on the wheel thereof. For this purpose I provide a bumping member which is secured on the tread of a tire and provided with a sharp projection so placed as to dig into the street if the automobile is moved with the shackle in place.

A further object of the invention is to provide a device which in addition to locking about the tire and felly of the wheel, will also lock about a spoke so that the shackle cannot be turned around on the tire to put the projection or bumping member out of action.

Further objects and advantages will be made evident hereinafter.

Referring to the drawing which is for illustrative purposes only, Fig. 1 is a view of the wheel of an automobile with a shackle in place thereon.

Figure 1:
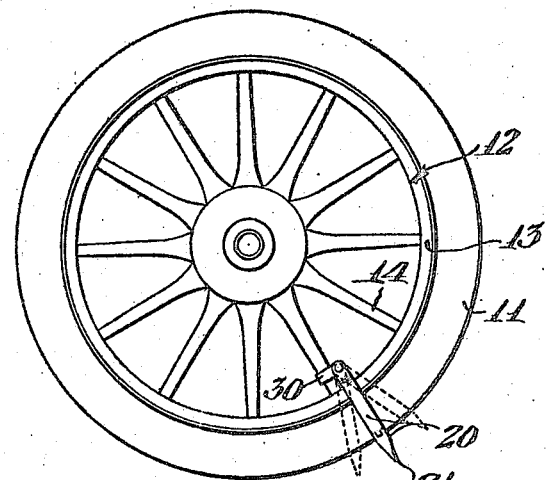
Figure 3:
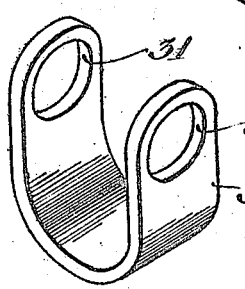
Fig. 3 shows a perspective view of this clamp.
Figure 2:
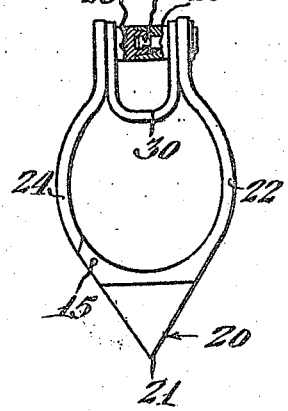
Fig. 2 shows a shackle using a one piece locking clamp.

All of these forms of shackle are designed to go over a tire 11, carried on a wheel 12 having a felly 13 and a series of spokes 14. Each of the shackles illustrated comprises a bumping block 20 having a pointed projection 21 which is so shaped that it will make a distinctive mark on the street in case the automobile is run with the shackle in place as shown in Fig. 1.

Extending upwardly from one side of the bumping block 20 is an arm 22 which terminates in a projection 23 which extends inside the felly 13 of the wheel when the shackle is in place thereon.

An arm 24 pivoted on a pin 15 on the bumping block 20 extends up and has projection 25 carrying a lock 26, the lock 26 locking the projections 23 and 25 together when the shackle is in place on the wheel. Projections 23 and 25 are preferably cylindrical.

It will be noted that the shackle can turn from the full line position shown in Fig. 1 to either of the dotted positions shown in that figure without exerting any wedging or jamming action on the spoke.

For the purpose of locking around the spoke I provide an attachment 30 comprising a bent piece of metal having holes 31 therein of proper size to allow the projections 23 and 25 to pass therethrough. The signal may be used with or without the attachment 30. When the attachment 30 is used, it insures the signal being held in place in case the tire 11 is purposely or accidentally deflated, thus giving some slight additional security.

This application is a division of my application Serial No. 363,087, filed March 2, 1920.

I claim as my invention:

1. A shackle for an automobile wheel comprising a bumping block; arms for securing said block upon the tread of said wheel; projections on said arms meeting inside the felly of the wheel; means for locking said projections together; and a U-shaped member of proper size to encircle a spoke, said U-shaped member having holes in either limb through which said projections pass and lock.

2. A shackle for an automobile wheel comprising a bumping block; a projection formed on said block and adapted to make a distinctive mark on the surface of the street if the automobile is moved with the shackle in place on a wheel thereof, arms for securing said block upon the tread of said wheel; projections on said arms meeting inside the felly of the wheel; means for locking said projections together; and a U-shaped member of proper size to encircle a spoke, said U-shaped member having holes in either limb through which said projections pass and lock.

3. In combination, a theft preventing device adapted to be applied to the tire and rim of an automobile wheel comprising a member adapted to project radially from the tread of the tire, relatively movable arms extending inwardly from said member on opposite sides of the tire and rim, coupling parts carried by the inner ends of said arms and adapted to be brought together at the inner side of said rim, a locking means for releasably locking said coupling parts together, of a yoke removably engaged with said parts and adapted to embrace a spoke of the wheel to prevent the device from being turned upon the tire and rim whereby to maintain said member at the tread of the tire.

4. In combination, a theft preventing device adapted to be applied to the tire and rim of an automobile wheel comprising a member adapted to project radially from the tread of the tire, relatively movable arms extending inwardly from said member on opposite sides of the tire and rim, coupling parts carried by the inner ends of said arms and adapted to be brought together at the inner side of said rim, a locking means for releasably locking said coupling parts together, of a yoke having openings to receive the coupling parts and adapted to embrace a spoke of the wheel to prevent the device from being turned upon the tire and rim whereby to maintain said member at the tread of the tire.

5. A shackle for an automobile wheel comprising a bumping block; a projection formed on said block and adapted to make a distinctive mark on the surface of the street if the automobile is moved with the shackle in place on a wheel thereof; arms for securing said block upon the tread of said wheel; projections on said arms meeting inside the felly of the wheel; means for locking said projections together; and means pivoted on said projections for encircling a spoke of said wheel.

In testimony whereof, I have hereunto set my hand at Los Angeles, California, this 15th day of February 1921.

EARLE E. CHAPMAN.